(12) United States Patent
Loofbourrow et al.

(10) Patent No.: US 8,473,507 B2
(45) Date of Patent: Jun. 25, 2013

(54) TOKENIZED SEARCH SUGGESTIONS

(75) Inventors: Wayne R. Loofbourrow, San Jose, CA (US); Julien Robert, Paris (FR); Alexandre Moha, Paris (FR); Olivier Bonnet, Paris (FR); Simon I. Bovet, Palo Alto, CA (US); Stephen Frederick Decker, San Francisco, CA (US); Brendan John Langoulant, San Francisco, CA (US); Julien Jacques Jalon, Paris (FR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/333,810

(22) Filed: Dec. 21, 2011

(65) Prior Publication Data

US 2012/0185498 A1   Jul. 19, 2012

Related U.S. Application Data

(60) Provisional application No. 61/433,122, filed on Jan. 14, 2011.

(51) Int. Cl.
*G06F 7/00* (2006.01)
*G06F 17/30* (2006.01)

(52) U.S. Cl.
USPC .......................................... 707/767; 707/766

(58) Field of Classification Search
USPC ......................................... 707/767, 765, 766
See application file for complete search history.

(56) References Cited

U.S. PATENT DOCUMENTS

| | | | |
|---|---|---|---|
| 5,960,448 A | 9/1999 | Reichek et al. | |
| 6,202,061 B1 | 3/2001 | Khosla et al. | |
| 6,401,097 B1 | 6/2002 | McCotter et al. | |
| 6,564,383 B1 | 5/2003 | Combs et al. | |
| 6,618,733 B1 | 9/2003 | White et al. | |
| 6,654,754 B1 | 11/2003 | Knauft et al. | |
| 6,760,721 B1 | 7/2004 | Chasen et al. | |
| 6,775,666 B1 | 8/2004 | Stumpf et al. | |
| 7,039,635 B1 | 5/2006 | Morgan | |
| 7,085,761 B2 | 8/2006 | Shibata | |
| 7,162,466 B2 | 1/2007 | Kaasten et al. | |
| 7,162,488 B2 | 1/2007 | DeVorchik et al. | |
| 7,328,199 B2 | 2/2008 | Ramsey et al. | |
| 7,333,982 B2 | 2/2008 | Bakalash et al. | |
| 7,392,248 B2 | 6/2008 | Bakalash et al. | |
| 7,657,603 B1 | 2/2010 | He et al. | |

(Continued)

OTHER PUBLICATIONS

U.S. Appl. No. 11/499,017, titled "Methods and Systems for Managing Data", by inventor Yan Arrouye, Filed Aug. 4, 2006, 144 pages (specification and drawings).

(Continued)

*Primary Examiner* — Robert Beausoliel, Jr.
*Assistant Examiner* — Nicholas Allen
(74) *Attorney, Agent, or Firm* — Blakely, Sokoloff, Taylor & Zafman LLP

(57) ABSTRACT

Embodiments of tokenized search suggestions include generating, by at least one suggestion engine executing on a data processing system, first suggestions based on first text input in a text input field. The first suggestions are displayed on a display device and a selection of one of the first suggestions is received. The first text input is replaced with a first token corresponding to the selected one of the first suggestions. The at least one suggestion engine generates second suggestions based on second text input in the text input field and filters the second suggestions using the selected one of the first suggestions. The filtered selections are displayed on a display device.

22 Claims, 11 Drawing Sheets

U.S. PATENT DOCUMENTS

| | | |
|---|---|---|
| 7,752,237 B2 | 7/2010 | Ray |
| 2003/0069882 A1 | 4/2003 | Nieswand et al. |
| 2004/0098250 A1 | 5/2004 | Kimchi et al. |
| 2005/0246324 A1 | 11/2005 | Paalasmaa et al. |
| 2006/0004739 A1 | 1/2006 | Anthony et al. |
| 2006/0031357 A1 | 2/2006 | Misra et al. |
| 2006/0085442 A1 | 4/2006 | Fujiwara |
| 2006/0195512 A1 | 8/2006 | Rogers et al. |
| 2007/0061306 A1 | 3/2007 | Pell et al. |
| 2007/0088734 A1 | 4/2007 | Krishnamurthy et al. |
| 2007/0143245 A1 | 6/2007 | Dettinger et al. |
| 2007/0156669 A1 | 7/2007 | Marchisio et al. |
| 2008/0021921 A1 | 1/2008 | Horn |
| 2010/0169353 A1 | 7/2010 | Soetarman |
| 2010/0179964 A1 | 7/2010 | Ramaswamy |

OTHER PUBLICATIONS

Timo Sirainen, http://dovecot.org/list/dovecot/2010-December/056015.html, Dec. 28, 2010, 1 pg.

Timo Sirainen, "dovecot-2.0"changeset,http://hg.dovecot.org/dovecot-2.0/rev/757cb3148407, May 17, 2010, 7 pgs.

"Understanding Exchange Search", Microsoft Tech Net, http://technet.microsoft.com/en-us/library/bb232132.aspx, Sep. 29, 2010, 2 pgs.

PCT International Search Report and Written Opinion of the International Search Authority for PCT/US2012/021226, mailed May 15, 2012.

TOKENIZED SEARCH SUGGESTIONS

This application claims priority to U.S. Provisional Patent Application No. 61/433,122 filed on Jan. 14, 2011, which is incorporated herein by reference in its entirety.

FIELD OF THE INVENTION

Embodiments of the invention are generally directed toward searching for files and other data. In particular, embodiments of the invention are directed toward generating search suggestions based on user input.

BACKGROUND

Existing search tools generally require a user to input text for each element of a search query. The search query may be intended to locate files, emails, calendar events, contacts, or other entities represented by data on a data processing system. Alternatively, the system may provide a user interface that allows a user to build a search query using various on-screen controls specific to the type of the search query element. Various "auto-complete" features may be provided, in which a list of possible search terms is provided which correspond to possible search terms/elements. However, existing implementations make it difficult to easily build complex search queries in a quick and intuitive manner.

SUMMARY

Embodiments of tokenized search suggestions include generating, by at least one suggestion engine executing on a data processing system, first suggestions based on first text input in a text input field. The first suggestions are displayed on a display device and a selection of one of the first suggestions is received. The first text input is replaced with a first token corresponding to the selected one of the first suggestions. The at least one suggestion engine generates second suggestions based on second text input in the text input field and filters the second suggestions using the selected one of the first suggestions. The filtered selections are displayed on a display device.

DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Embodiments of tokenized search suggestions are described herein. Tokenized search suggestions may be used to increase the efficiency and effectiveness of search query creation. For example, a user may want to build a search query which will locate email messages written by a particular person. If that person uses multiple email addresses, existing implementations might require a user to manually input each email address as separate terms in a search query. In one embodiment of tokenized search suggestions, the user enters some text that may match the person's name, one of the person's email addresses, or text located in the subject or body of an email message received from that person. In one or more of these situations, a suggestion engine may infer that the user is interested in a particular person with an entry in the user's address book. The user may adopt this suggestion into their search query. The suggestion may match email messages sent from any email addresses associated with that person's entry in the user's address book. The user may further refine their search by inputting an additional textual search query element. The user may view and add an additional suggestion to the search query, such as a suggestion pertaining the contents of an email message's subject line.

Figure 1:
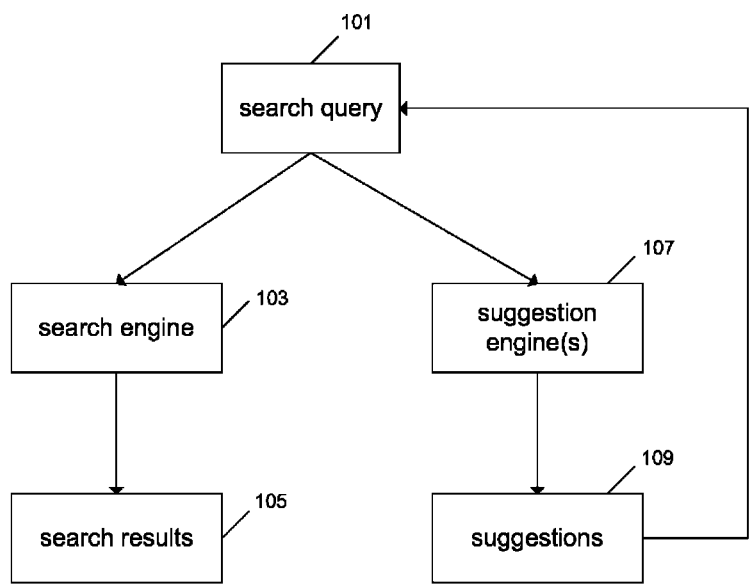
FIG. 1 is a diagram illustrating a tokenized search suggestion system according to an embodiment of the invention.

FIG. 1 is a diagram illustrating a tokenized search suggestion system. Search query 101 corresponds to user input. For example, the user may input textual data using a keyboard. In other embodiments, the user may select text in an application (e.g., a web browser) and cause a search to be performed on that text. The user may paste text into a text input field. The search query 101 acts as input to the search engine 103 and suggestion engine(s) 107. Search engine 103 uses the search query to perform a search through files and other data using techniques known in the art. The files may include files stored on a user's data processing system and on other remote systems. The breadth of the search may include metadata and full text content of files, emails, events, contacts, applications, bookmarks, etc. The metadata and the full text content may be stored in one or more indexes used to make the search more efficient as is known in the art. Search engine 103 generates search results 105, which may be displayed to the user in a graphical user interface.

Suggestion engine(s) 107 may receive search query 101 as an input and use the search query to generate suggestions 109 which the user can add to search query 101 to refine their search. Various types of suggestion engines may be used depending on the context in which a user is performing a search. For example, if the user is searching within the context of an email application, a mailbox suggestion engine may be used which limits the search to a particular mailbox or mailboxes. In a web browser context, a suggestion engine may be used that limits a search to a particular website or websites. Generalized suggestion engines may be used in most or all contexts, such as a suggestion engine that generates suggestions from search results such as those generated by search engine 103.

A generalized search engine may be tailored to a particular search context using various suggestion scopes. For example, when searching in an email application context, available suggestion scopes may include the "from:" field, the "to:" field, the "subject:" field, and a catch-all "entire message:" field. In another example, a generalized suggestion engine used in a file system search context may include scopes such as file size, date of last modification, date of creation, file name, etc. Some search contexts may include hidden or implicit scopes as well. For example, in the email search context, search results and suggestions may be implicitly limited to results and suggestions that correspond to email messages, such as email messages themselves, contacts/people, email message attachments, etc. In a calendar search context, results and suggestions may be limited to events and contacts.

Suggestions 109 may also be displayed to the user for review and possible incorporation into the current search. One method of incorporating a suggestion into a search is described below in conjunction with FIG. 2.

Figure 2:
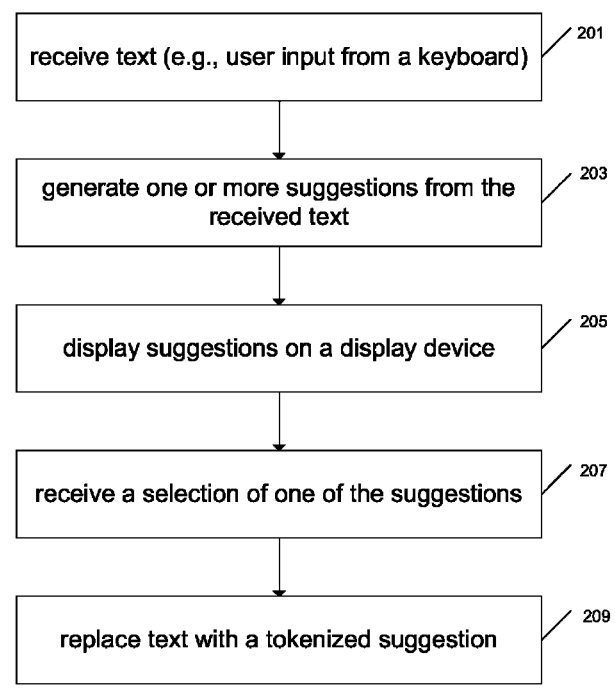
FIG. 2 is a flow chart illustrating a method of generating a tokenized search suggestion according to an embodiment of the invention.
Figure 3:
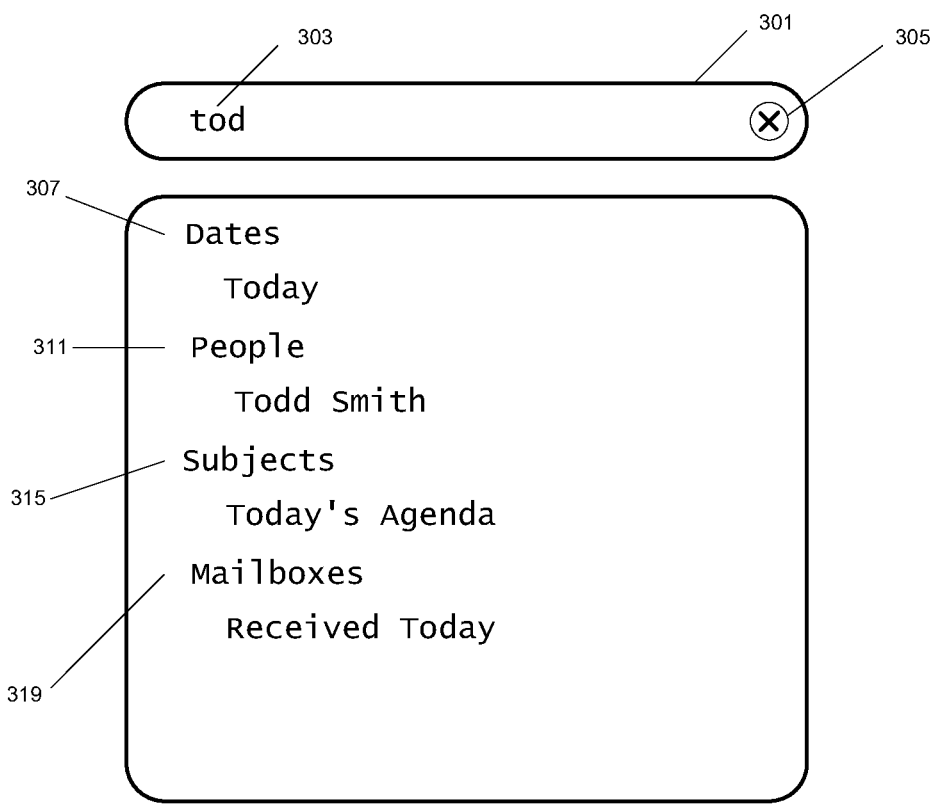
FIG. 3 is a diagram illustrating a tokenized search suggestion graphical user interface according to an embodiment of the invention.

FIG. 2 is a flow chart illustrating a method of generating a tokenized search suggestion and incorporating the suggestion into a current search. FIG. 3 is a diagram illustrating a tokenized search suggestion graphical user interface and will be described in parallel with FIG. 2. At block 201 of FIG. 2, the method receives text input from a user, such as from a keyboard. One example of receiving text input is illustrated by text input field 301 in FIG. 3. The text input 303 has been typed by the user into the text input field 301. Clicking on clear all button 305 causes all query elements in field 301 to be deleted.

At block 203, the method generates one or more suggestions from the received text input. In one embodiment, suggestion engine(s) 107 of FIG. 1 may be used to generate the one or more suggestions. If multiple suggestion engine(s) are used, suggestions may be merged before display (not shown). Depending on the number of suggestions generated, the number provided for display may be less than the total number generated. The suggestions provided for display may filtered using ranking techniques known in the art. Duplicate suggestions (from the same or different suggestion engines) may also be eliminated before display occurs. At block 205, the method displays some or all of the suggestions on a display device. The ranked list may be used to enhance the usability of the displayed suggestions. For example, the number of suggestions displayed in a particular category may be limited, as well as the total number of suggestions displayed. This may be done in order to keep the suggestion display from requiring a scrolling window. At block 207, the method receives a selection of one of the displayed suggestions, such as receiving a mouse click in a menu of suggestions. At block 209, the method replaces the text input in the text input field with a token corresponding to the selected suggestion.

FIG. 3 illustrates one example of this in the window shown under the text input field 301. In FIG. 3, an email context search results in four different categories of suggestions: dates 307, people 311, subjects 315, and mailboxes 319.

Additional categories of suggestions are also possible. One or more categories of suggestions may generated by the same or different suggestion engines. For example, dates 307 may be generated by a date suggestion engine that looks for text input that matches date keywords, such as "today" or "tomorrow." After a date suggestion is incorporated into a search query, the date suggestion may limit search results to those matching the corresponding date range of the suggestion. The impact of the date range may be further refined by selecting a particular timestamp associated with an email message, such as date sent, date received, date read, etc.

People 311 and subjects 315 may be generated by a generalized suggestion engine that extracts both people (e.g., senders and receivers of emails) and subjects for suggestions, since these fields are relevant to a search performed in an email context. People 311 may be further refined with a particular scope, as described below in conjunction with FIG. 8. The scope may limit which field of an email is checked for a matching person, such as the "from" field or the "to" field.

Mailboxes 319 may be generated by a mailbox suggestion engine that matches the text input to the name of a mailbox or mailboxes. This may include mailboxes created by the user and assigned a text name. The suggestion may also match "smart" mailboxes or automatically generated mailboxes. For example, the "received today" mailbox may be a feature of the email program or the file system rather than a mailbox created by the user. In a search query, a mailbox suggestion may limit the search to results located in the suggested mailbox.

In one embodiment, suggestions may be drawn from search results from the current search query. The search results may be normalized before being presented to the user as suggestions. For example, an email subject line may be changed from "Re: Today's Agenda" to "Today's Agenda" before being presented to the user. Normalization may broaden the search to include email threads and/or conversations by removing automatically generated text from the subject such as "Re:." Suggestions may be indirectly derived from search results. For example, if the current search query matches the subject of an email message, the suggestion engine may search the user's address book for people whose address book entry includes the email address of the author of the email message with the matching subject. The matching person may be included as a suggestion, although identifying the person required following from a matching subject of an email message, to the author of the email message, and finally to an entry in the user's address book that includes that email address of the author. In this way, tokenized search suggestions can allow a user to more quickly add relevant elements (e.g., suggestions) to a search query.

Figure 4:
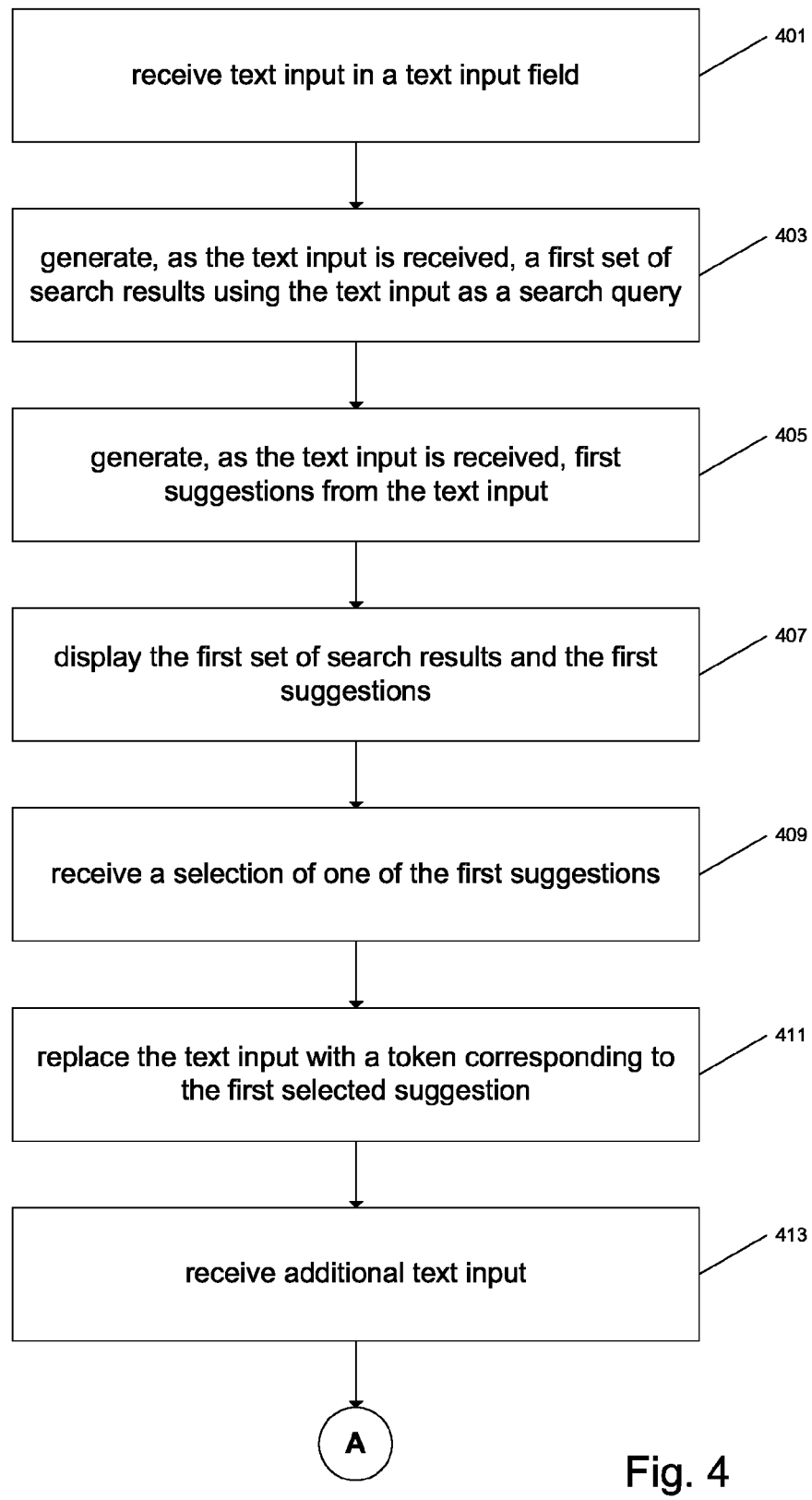
FIGS. 4 and 5 are flow charts illustrating a method of generating multiple tokenized search suggestions according to an embodiment of the invention.
Figure 5:
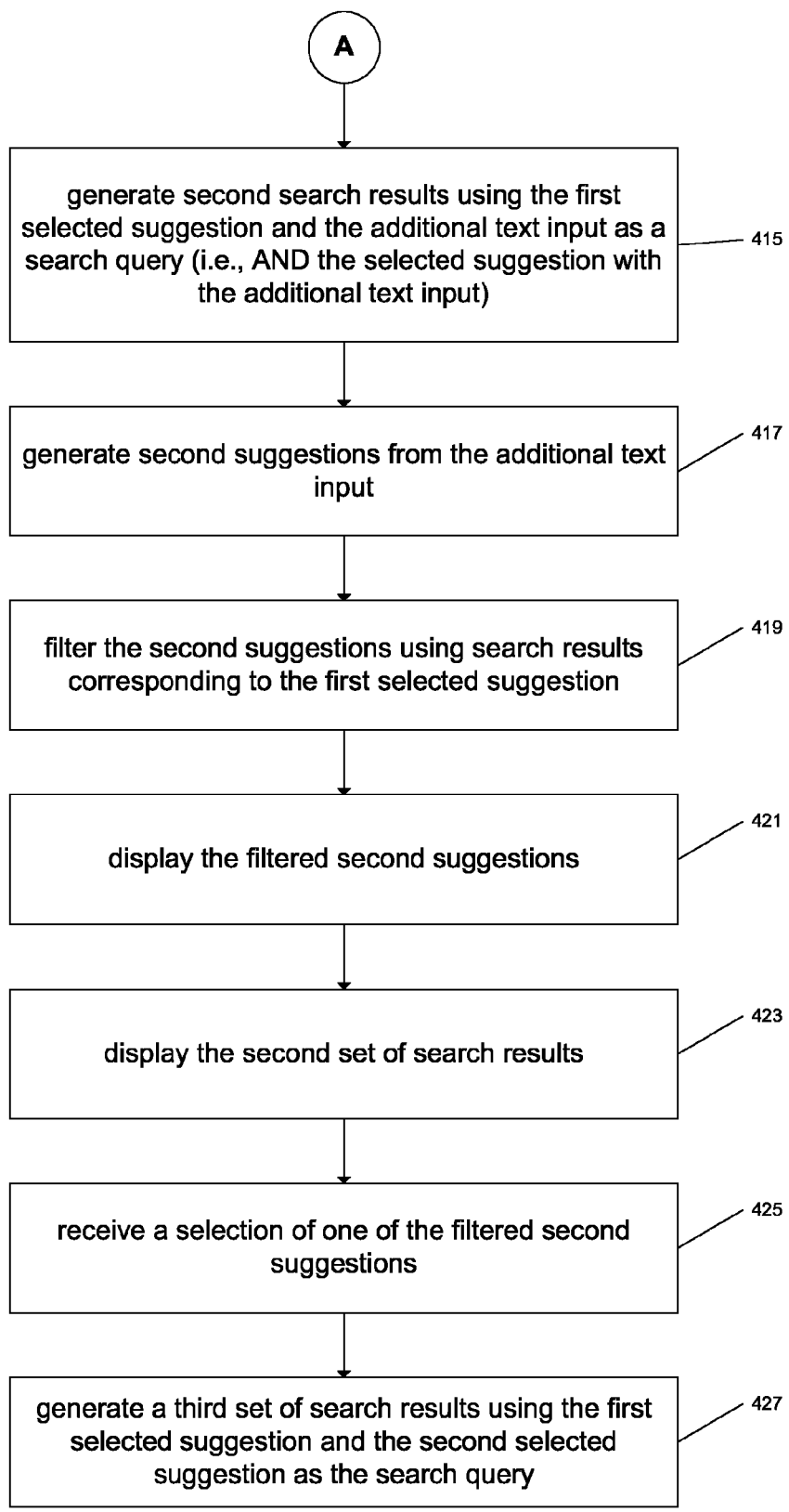

FIGS. 4 and 5 are flow charts illustrating a method of generating multiple tokenized search suggestions. At block 401, the method receives text input in a text input field, such as field 301 in FIG. 3. At block 403, the method generates a first set of search results using the text input as a search query. Search engine 103 in FIG. 1 may be used to generate the search results. The search may be re-run and the results updated as the text input is received. That is, as the user types the first character of the text input, a search is performed, and as the user enters the second character of the text input, a new search is run. In this way, the user may receive automatically updated search results and suggestions as the user enters the text input. At block 405, the method generates suggestions using the text input. The suggestions may be generated by suggestion engine(s) 107 in FIG. 1. As in the search results, the suggestions may be generated as each character of the text input is received.

At block 407, the first set of search results and the first suggestions are displayed to the user. The first suggestions may be displayed in the graphical user interface illustrated in FIG. 3. The displayed suggestions may be updated as the user continues to enter text input. At block 409, a selection of one of the displayed suggestions in received. A graphical user interface for selecting a suggestion is described in greater detail below in conjunction with FIG. 6. At block 411, the method replaces the text input with a token corresponding to the first selected suggestion. A token may be a graphical user interface element that represents a tokenized search suggestion. At block 413, the method receives additional text input. In one embodiment, after the user incorporates a first tokenized search suggestion into a search query, they input further text which is used to further refine the search. The user may also use the additional text input to identify and incorporate another tokenized search suggestion into the search query.

Turning to FIG. 5, at block 415, the method generates second search results using the first selected suggestion and the additional text input as a search query. In one embodiment, the search query is formed by ANDing the tokenized search suggestion with the additional text input. That is, only results that match both the tokenized search suggestion and the additional text input are considered search results for display. At block 417, the method generates second suggestions from the additional text input. The second suggestions may also be generated by suggestion engine(s) 107 in FIG. 1. At block 419, the second suggestions are filtered using search results corresponding to the first selected suggestion. Filtering suggestions is described in greater detail below in conjunction with FIG. 9. Generally, filtered suggestions are those suggestions generated by the additional text input that are not excluded by results of the previously selected tokenized search suggestion.

At block 421, the filtered second suggestions are displayed to the user along with the second set of search results at block 423. At block 425, the method receives a selection of one of the filtered second suggestions and at block 427 the method generates a third set of search results using the first selected suggestion and the second selected suggestion as the search query. These results may then be displayed to the user. In some embodiments, the user may continue to enter additional text and select additional suggestions until the search has narrowed the results down sufficiently for the user to locate the desired file, email, or other search result.

In one embodiment, the links between elements of a search query may be added automatically according to a set of rules. For example, suggestions using the same scope (e.g., "From"), may be automatically linked using a Boolean OR operator. Suggestions using different scopes (e.g., "To" and "From") may be automatically linked using a Boolean AND operator. In other embodiments, the user interface may include a graphical representation of the linkage between two query elements. In this embodiment, the linkage between query elements may be modified, such as in response to user input.

Figure 6:
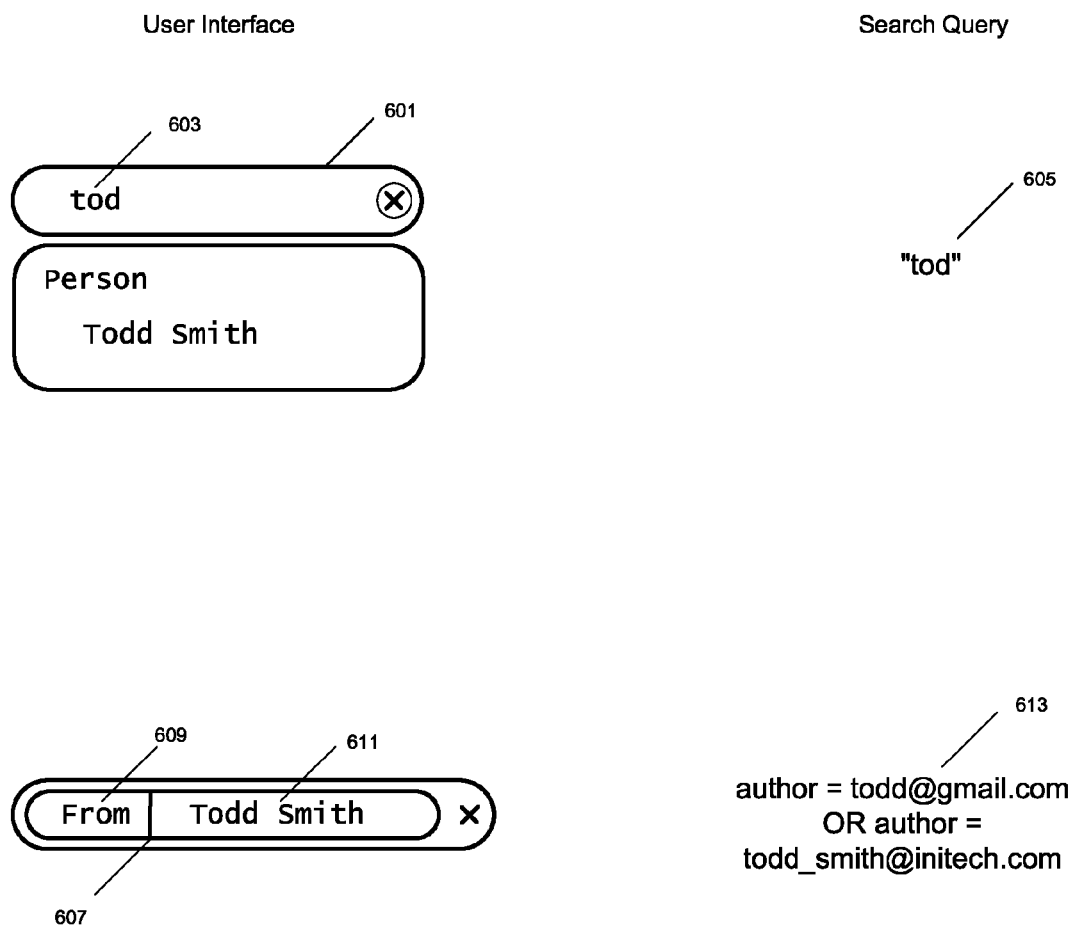
FIG. 6 is a diagram illustrating changes to a search query using a tokenized search suggestion according to an embodiment of the invention.

FIG. 6 is a diagram illustrating changes to a search query using a tokenized search suggestion. On the left hand side of FIG. 6, a user interface is illustrated to demonstrate changes to the interface when a text input 603 in text input field 601 is replaced by a token 607 corresponding to a selected suggestion. The selected suggestion 611 is the person "Todd Smith" and the default scope 609 is "From."

On the right hand side of FIG. 6, a representation of the search query corresponding to the user interface state is shown. Query 605 corresponds to the raw text input 603, while query 613 corresponds to information drawn from the contact describing "Todd Smith" and scoped based on the default scope "From." The contact "Todd Smith" includes two email addresses for Todd Smith: todd@gmail.com and todd_smith@initech.com. In some embodiments, more email addresses may be available for searching. The scope 609, "From," indicates that the search results should be authored by Todd Smith, hence the search query matches emails that were sent from Todd's gmail account (author=todd@gmail.com) or emails that were sent from Todd's other email account (author=todd_smith@initech.com). The "OR" term indicates that results may match either email address.

In the example illustrated by FIG. 6, the overall scope of the search query has been narrowed by replacing the raw text input with the token, since the raw text would match both email addresses and may match other results that contain text input 603. In other examples, the search would be broadened. For example, if Todd Smith had a third email address that did not contain text input 603, the tokenized search suggestion would locate an email message written by Todd Smith that might not otherwise match the text input 603.

Figure 7:
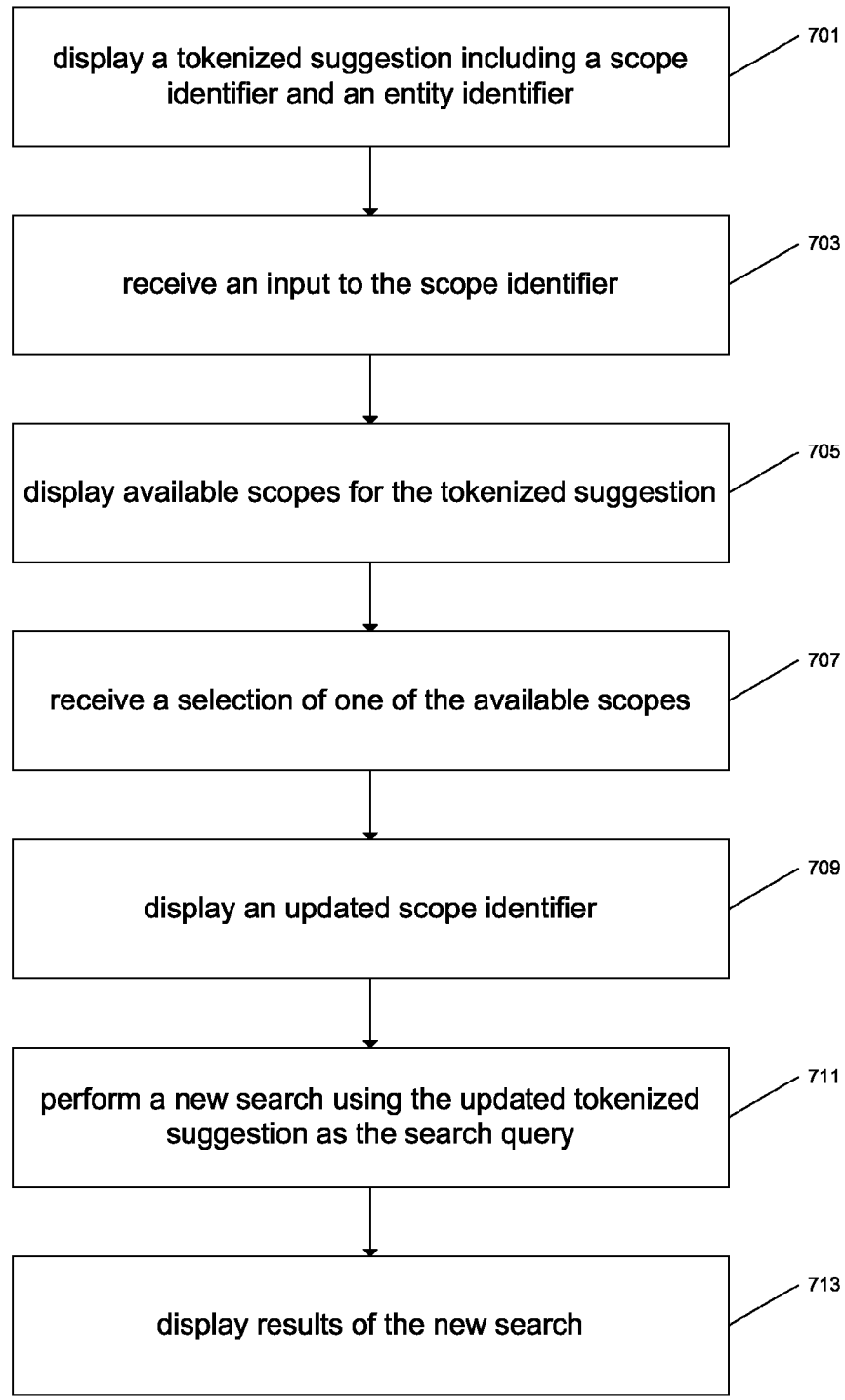
FIG. 7 is a flow chart illustrating a method of changing the scope of a tokenized search suggestion according to an embodiment of the invention.
Figure 8:
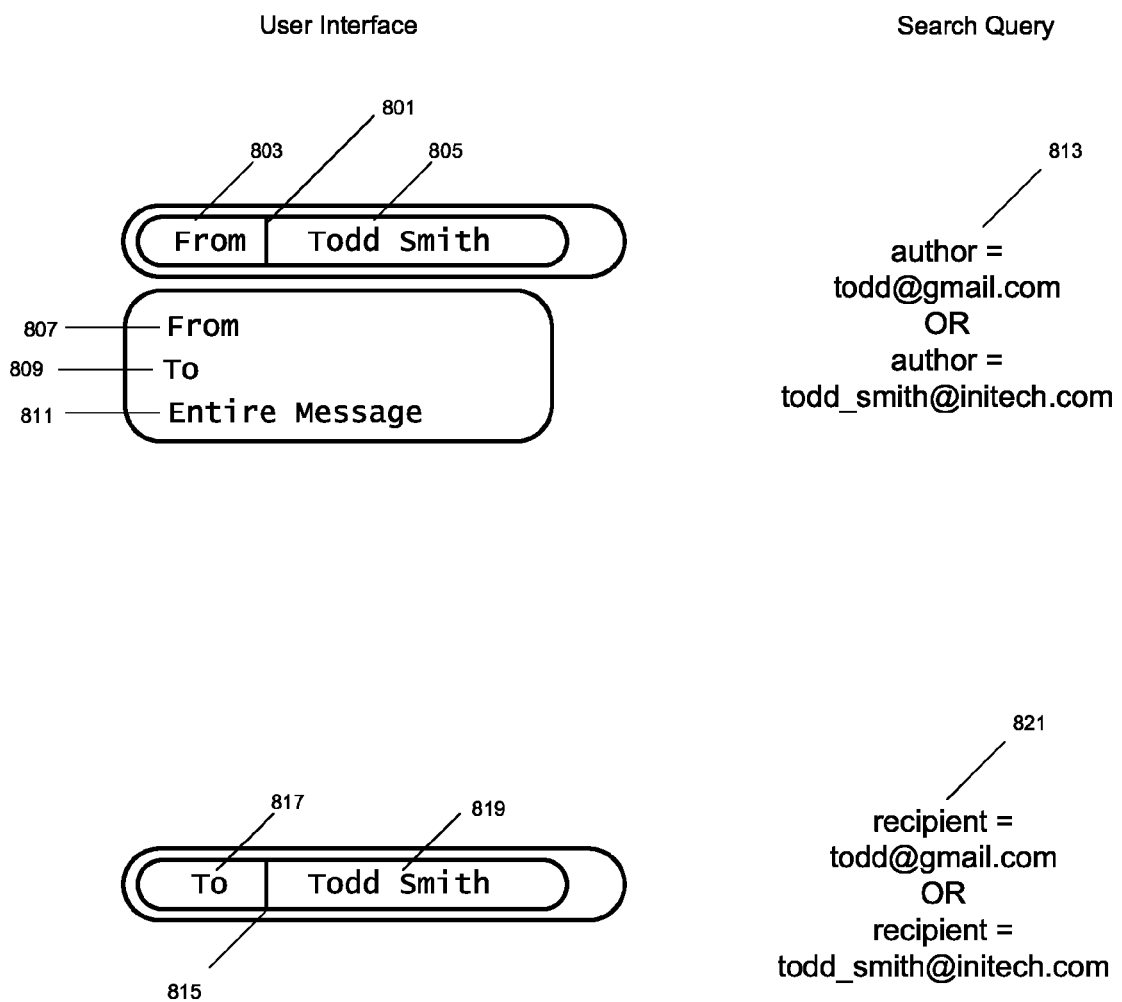
FIG. 8 is a diagram illustrating changes to a search query resulting from changes to the scope of a tokenized search suggestion according to an embodiment of the invention.

FIG. 7 is a flow chart illustrating a method of changing the scope of a tokenized search suggestion. FIG. 8 is a diagram illustrating changes to a search query resulting from changes to the scope of a tokenized search suggestion and will be described in conjunction with FIG. 7.

At block 701, the method displays a tokenized search suggestion including a scope identifier and an entity identifier. In FIG. 8, tokenized suggestion 801 includes scope identifier 803 ("From") and entity identifier 805 ("Todd Smith"). This indicates that the suggestion 801 currently matches emails that were sent from an email address associated with the entity Todd Smith. This entity may correspond to an address book entry or a contact list entry which includes one or more email addresses associated with Todd Smith. The address book may be unique to a current user or may be imported from another location or may be provided as directory service by an enterprise system.

At block 703, the method receives an input to the scope identifier. For example, the user may have clicked a mouse within the graphical region of scope identifier 803. Alternatively, a keyboard shortcut, a voice command, or other source of user input may be used to provide the input. At block 705, the method displays the available scopes for the suggestion 801. These include the current scope 807 ("From"), a recipient scope 809 ("To"), and an entire message scope 811 ("Entire Message"). On the right hand side of FIG. 8, search query 813 reflects the current meaning of suggestion 801. At block 707, the method receives a selection of one of the available scopes. For example, the user may have clicked on one of the scopes 807, 809, or 811. At block 709, the method displays an updated scope identifier in the suggestion. For example, in FIG. 8, the new scope 817 is displayed in updated suggestion 815. The entity identifier 819 remains unchanged from entity identifier 805.

At block 711, the method performs a new search using the updated tokenized suggestion as the search query. An example of an updated tokenized suggestion and corresponding search query is illustrated in FIG. 8 at suggestion 815 and search query 821. After the scope identifier 817 is changed to "To," the search query 821 is automatically changed to match emails sent to the two email addresses associated with the Todd Smith entity. In some embodiments, additional scopes may be available. For example, more precise "From Work Email" or "To Work Email" scopes may be available.

In some embodiments, suggestions may be generalized to include a scope identifier and a string instead of a entity. For example, a suggestion might include the "From" scope but rather than an entity such as "Todd Smith," might include the text string "tod." The resulting search query would not be limited to email messages sent from one of Todd Smith's email addresses. Instead, the resulting search query would match email messages sent from an email address that contains the text "tod."

In one embodiment, changing the scope of a suggestion may cause elements of the current search query to be linked using different operators. For example, if a query includes one suggestion with a "From" scope and another suggestion with a "To" scope, the two suggestions may be linked using a Boolean AND operator. However, if the user changes the second suggestion to a "From" scope, the elements may be re-linked using a Boolean OR operator.

In one embodiment, search results may include text in a language other than the current or default language of the data processing system being used to perform the search. For example, the data processing system may be configured to use the English language, while some of the email messages stored on the system have subject fields and/or message body written in French. The system may detect that the subject is using a different language (e.g., when the email message is indexed) and mark the subject as being in French. When the search results and suggestions are generated, the subject line may be translated automatically into English for matching purposes, or the search query may be translated into French. This may provide more useful search results for the user. Content and metadata in other languages may be handled automatically in a similar manner using known language identification and translation techniques.

Figure 9:
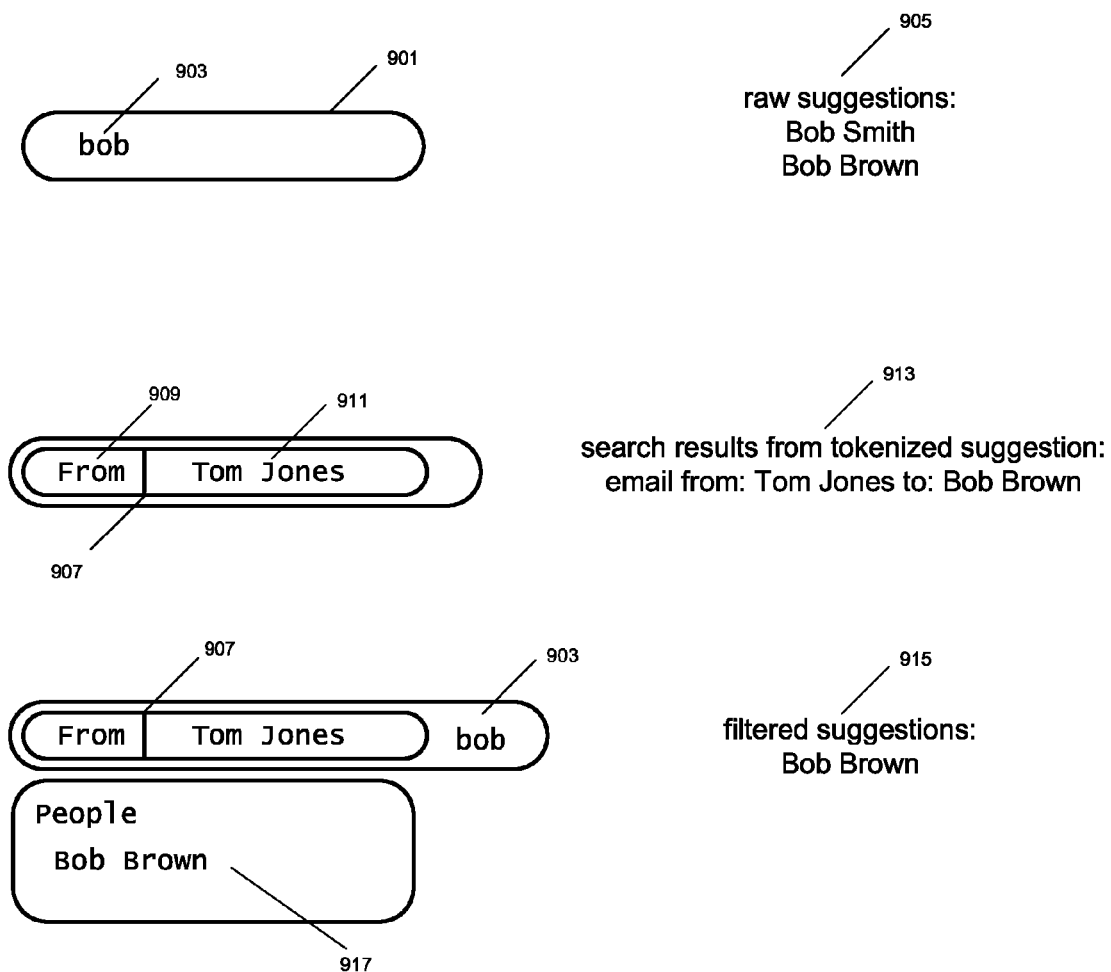
FIG. 9 is a diagram illustrating filtering of suggestions using a previously selected suggestion according to an embodiment of the invention.

FIG. 9 is a diagram illustrating filtering of suggestions using a previously selected suggestion. In other words, when displaying suggestions to the user after one or more previous suggestions have been added to the search query, the displayed suggestions are filtered in order to be consistent with the previously added suggestions.

On the left hand side of FIG. 9, text input field 901 is displayed in three different states. In the first state, text input 903 produces suggestions 905, which include two entities: Bob Smith and Bob Brown. That is, if input 903 was the only component of the search query, two suggestions would be provided to the user. Suggestion 907 includes scope identifier 909 and entity identifier 911. As the only component of a search query, suggestion 907 generates a single result 913: an email from Tom Jones to Bob Brown. In its third state, input field 901 includes suggestion 907 and text input 903. Suggestions 917 includes Bob Brown, but does not include Bob Smith, because filtered suggestions 915 does not include Bob Smith. That is, since suggestion 907 is present in the search query, the raw suggestions 905 for text input 903 have been filtered down to the suggestion that is not inconsistent with suggestion 907.

In some embodiments, suggestions may not be filtered, or the user may be allowed to temporarily halt filtering with an additional command or input. For example, building a search query that would locate emails from two different people would be easier if a suggestion for the first person is selected and then a suggestion for a second person is selected. However, if the second person is excluded from the suggestions by the first suggestion, this would make building the desired search query more difficult. In one embodiment, suggestions that would be linked to previously selected suggestions using a Boolean OR operation are not filtered from the suggestion list. That is, if a suggestion that would otherwise be excluded by a previously selected suggestion (e.g., "Bob Smith" in suggestions 905) would, if selected, become a suggestion that would be disjunctively linked to the previous suggestion (e.g., linked with a Boolean OR), then the suggestion would not be filtered. If this embodiment were applied to FIG. 9, then suggestions 915 would include both Bob Brown and Bob Smith, since Bob Smith, if selected as a suggestion, would be linked to suggestion 907 with a Boolean OR operator because their scopes match.

In another embodiment, suggestion filtering may be disabled entirely, although this may make the tokenized search suggestions less effective at helping the user build search queries. Different tiers of suggestion filtering may also be used. For example, a first tier of suggestion filtering may involve filtering suggestions based on the search context. Suggestions related to calendar events matching the text input in an email search context may be excluded automatically and vice versa. Other context-specific filters may be used as well, such as calendar events in a file search context, etc. A second tier of suggestion filtering may be as described above, which prevents some suggestions from being filtered depending on how a particular suggestion would be linked into the existing search query. In some embodiments, suggestion filtering may be disabled by a command received, for example, from a user.

Figure 10:
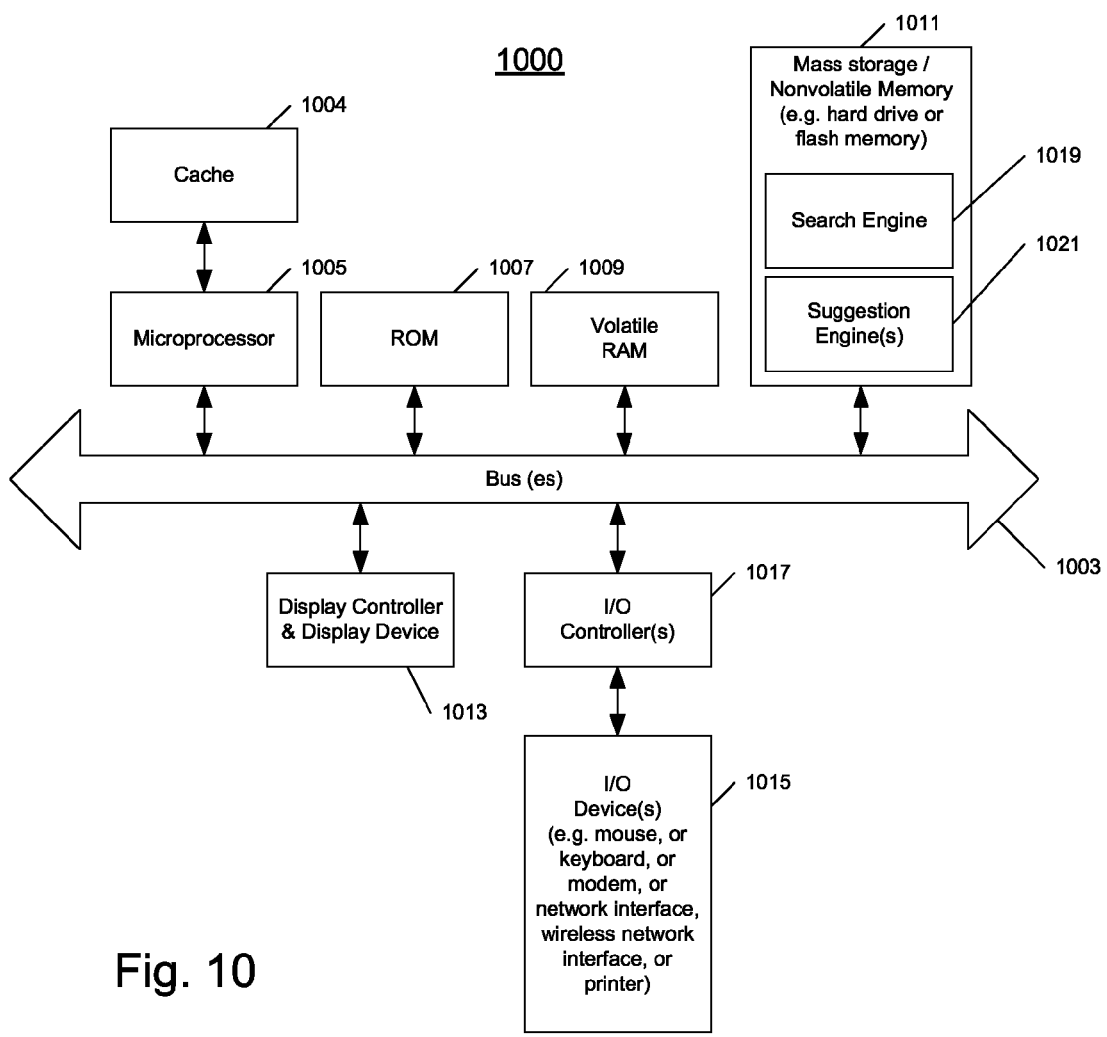
FIG. 10 is a diagram illustrating a data processing system that may be used with an embodiment of the invention.

FIG. 10 shows one example of a data processing system, which may be used with one embodiment the present invention. Note that while FIG. 10 illustrates various components of a computer system, it is not intended to represent any particular architecture or manner of interconnecting the components as such details are not germane to the present invention. It will also be appreciated that network computers, tablet computers, and other data processing systems which have fewer components or perhaps more components may also be used with the present invention.

As shown in FIG. 10, the computer system 1000, which is a form of a data processing system, includes a bus 1003 which is coupled to a microprocessor(s) 1005 and a ROM (Read Only Memory) 1007 and volatile RAM 1009 and a non-volatile memory 1011. Executable instructions corresponding to a search engine 1019 and suggestion engine(s) 1021 may be stored in non-volatile memory 1011. Search engine 1019 may correspond to search engine 103 in FIG. 1, while suggestion engine(s) 1021 may correspond to suggestion engine(s) 107. The microprocessor 1005 is coupled to cache 1004. The microprocessor 1005 may retrieve the instructions from the memories 1007, 1009, 1011 and execute the instructions to perform operations described above. The bus 1003 interconnects these various components together and also interconnects these components 1005, 1007, 1009, and 1011 to a display controller and display device 1013 and to peripheral devices such as input/output (I/O) devices which may be mice, touch screens, touch pads, touch sensitive input devices, keyboards, modems, network interfaces, printers and other devices which are well known in the art. Typically, the input/output devices 1015 are coupled to the system through input/output controllers 1017. The volatile RAM (Random Access Memory) 1009 is typically implemented as dynamic RAM (DRAM) which requires power continually in order to refresh or maintain the data in the memory. Various embodiments of the invention may utilize tangible storage media such as DRAM, disk drives, flash drives, and other types of tangible storage. Non-transitory storage media may be used as well, including DRAM, disk drives, flash drives, etc.

The mass storage 1011 is typically a magnetic hard drive or a magnetic optical drive or an optical drive or a DVD RAM or a flash memory or other types of memory systems which maintain data (e.g., large amounts of data) even after power is removed from the system. Typically, the mass storage 1011 will also be a random access memory although this is not required. While FIG. 10 shows that the mass storage 1011 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1003 may include one or more buses connected to each other through various bridges, controllers and/or adapters as is well known in the art.

Figure 11:
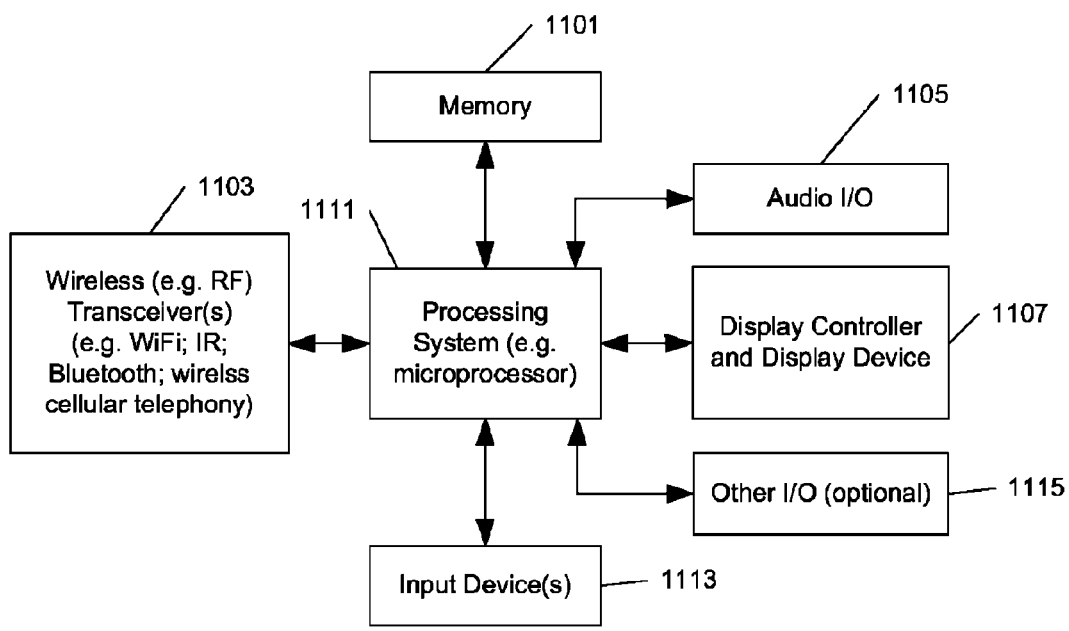
FIG. 11 is a diagram illustrating a device that may be used with an embodiment of the invention.

FIG. 11 shows an example of another data processing system which may be used with one embodiment of the present invention. The data processing system 1100 shown in FIG. 11 includes a processing system 1111, which may be one or more microprocessors, or which may be a system on a chip integrated circuit, and the system also includes memory 1101 for storing data and programs for execution by the processing system. The system 1100 also includes an audio input/output subsystem 1105 which may include a microphone and a speaker for, for example, playing back music or providing telephone functionality through the speaker and microphone.

A display controller and display device 1107 provide a visual user interface for the user; this digital interface may include a graphical user interface which is similar to that shown on a Macintosh computer when running OS X operating system software. The system 1100 also includes one or more wireless transceivers 1103. A wireless transceiver may be a WiFi transceiver, an infrared transceiver, a Bluetooth transceiver, and/or a wireless cellular telephony transceiver. It will be appreciated that additional components, not shown, may also be part of the system 1100 in certain embodiments, and in certain embodiments fewer components than shown in FIG. 11 may also be used in a data processing system.

The data processing system 1100 also includes one or more input devices 1113 which are provided to allow a user to provide input to the system. These input devices may be a keypad or a keyboard or a touch panel or a multi touch panel. The data processing system 1100 also includes an optional input/output device 1115 which may be a connector for a dock. It will be appreciated that one or more buses, not shown, may be used to interconnect the various components as is well known in the art. The data processing system shown in FIG. 11 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 1100 may be a network computer or an embedded processing device within another device, or other types of data processing systems which have fewer components or perhaps more components than that shown in FIG. 11.

In the foregoing specification, tokenized search suggestions have been described with reference to exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A non-transitory computer readable medium storing instructions which when executed by a processor cause the processor to perform a method, the method comprising:
   generating a first tokenized search suggestion using a first selected suggestion and a first default suggestion scope;
   generating a first search query using the first tokenized search suggestion;
   performing a first search using the first search query;
   receiving an input indicating to change the first default suggestion scope to a second suggestion scope;
   generating an updated first tokenized search suggestion using the selected suggestion and the second suggestion scope;
   generating a second search query using the updated first tokenized search suggestion;
   performing a second search using the second search query;
   displaying results of the second search;
   generating additional search suggestions from a text input;
   receiving a selection of a second selected suggestion from the additional search suggestions;
   generating a second tokenized search suggestion using the second selected suggestion and a second default suggestion scope; and
   generating a third search query using the updated first tokenized search suggestion and the second tokenized search suggestion.

2. The non-transitory computer readable medium of claim 1, wherein the first default suggestion scope is configurable by a year.

3. The non-transitory computer readable medium of claim 1, the method further comprising:
   combining the updated first tokenized search suggestion and the second tokenized search suggestion with a Boolean OR operator if a scope of the updated first tokenized search suggestion is the same as a scope of the second tokenized search suggestion.

4. The non-transitory computer readable medium of claim 3, the method further comprising:
   combining the updated first tokenized search suggestion and the second tokenized search suggestion with a Boolean AND operator if the scope of the updated first tokenized search suggestion is different than the scope of the second tokenized search suggestion.

5. The non-transitory computer readable medium of claim 4, wherein generating additional search suggestions from a text input is comprises merging suggestions generated by at least one suggestion engine using the text input.

6. The non-transitory computer readable medium of claim 5, wherein the at least one suggestion engine comprises at least one of a date suggestion engine, a mailbox suggestion engine, and a search suggestion engine.

7. The non-transitory computer readable medium of claim 6, wherein each suggestion engine generates suggestions with different scopes.

8. A data processing system comprising:
   means for generating a first tokenized search suggestion using a first selected suggestion and a first default suggestion scope;
   means for generating a first search query using the first tokenized search suggestion;
   means for performing a first search using the first search query;
   means for receiving an input indicating to change the first default suggestion scope to a second suggestion scope;
   means for generating an updated first tokenized search suggestion using the selected suggestion and the second suggestion scope;
   means for generating a second search query using the updated first tokenized search suggestion;
   means for performing a second search using the second search query; and
   means for displaying results of the second search;

means for generating additional search suggestions from a text input;

means for receiving a selection of a second selected suggestion from the additional search suggestions;

means for generating a second tokenized search suggestion using the second selected suggestion and a second default suggestion scope; and means for generating a third search query using the updated first tokenized search suggestion and the second tokenized search suggestion.

9. The data processing system of claim 8, wherein the first default suggestion scope is configurable by a user.

10. The data processing system of claim 8, further comprising:

means for combining the updated first tokenized search suggestion and he second tokenized search suggestion with a Boolean OR operator if a scope of the updated first tokenized search suggestion is the same as a scope of the second tokenized search suggestion.

11. The data processing system of claim 10, further comprising:

means for combining the updated first tokenized search suggestion and the second tokenized search suggestion with a Boolean AND operator if the scope of the updated first tokenized search suggestion is different than the scope of the second tokenized search suggestion.

12. The data processing system of claim 11, wherein generating additional search suggestions from a text input is comprises merging suggestions generated by at least one suggestion engine using the text input.

13. The data processing system claim 12, wherein the at least one suggestion engine comprises at least one of a date suggestion engine, a mailbox suggestion engine, and a search suggestion engine.

14. The data processing system of claim 13, wherein each suggestion engine generates suggestions with different scopes.

15. A computer-implemented method comprising:

generating a first tokenized search suggestion using a first selected suggestion and a first default suggestion scope;

generating a first search query using the first tokenized search suggestion;

performing a first search using the first search query;

receiving an input indicating to change the first default suggestion scope to a second suggestion scope;

generating an updated first tokenized search suggestion using the selected suggestion and the second suggestion scope;

generating a second search query using the updated first tokenized search suggestion;

performing a second search using the second search query;

displaying results of the second search;

generating additional search suggestions from a text input;

receiving a selection of a second selected suggestion from the additional search suggestions;

generating a second tokenized search suggestion using the second selected suggestion and a second default suggestion scope; and generating a third search query using the updated first tokenized search suggestion and the second tokenized search suggestion.

16. The computer-implemented method of claim 15, wherein the first default suggestion scope is configurable by a user.

17. The computer-implemented method of claim 15, further comprising:

combining the updated first tokenized search suggestion and the second tokenized search suggestion with a Boolean OR operator if a scope of the updated first tokenized search suggestion is the same as a scope of the second tokenized search suggestion.

18. The computer-implemented method of claim 17, further comprising:

combining the updated first tokenized search suggestion and the second tokenized search suggestion with a Boolean AND operator if the scope of the updated first tokenized search suggestion is different than the scope of the second tokenized search suggestion.

19. The computer-implemented method of claim 18, wherein generating additional search suggestions from a text input is comprises merging suggestions generated by at least one suggestion engine using the text input.

20. The computer-implemented method of claim 19, wherein the at least one suggestion engine comprises at least one of a date suggestion engine, a mailbox suggestion engine, and a search suggestion engine.

21. The computer-implemented method of claim 20, wherein each suggestion engine generates suggestions with different scopes.

22. An apparatus comprising:

a processing device, wherein the processing device executes instructions that cause the apparatus to:

generate a first tokenized search suggestion using a first selected suggestion and a first default suggestion scope;

generate a first search query using the first tokenized search suggestion;

perform a first search using the first search query;

receive an input indicating to change the first default suggestion scope to a second suggestion scope;

generate an updated first tokenized search suggestion using the selected suggestion and the second suggestion scope;

generate a second search query using the updated first tokenized search suggestion;

perform a second search using the second search query;

display results of the second search;

generate additional search suggestions from a text input;

receive a selection of a second selected suggestion from the additional search suggestions;

generate a second tokenized search suggestion using the second selected suggestion and a second default suggestion scope; and generate a third search query using the updated first tokenized search suggestion and the second tokenized search suggestion.

* * * * *